(12) United States Patent
Milman (10) Patent No.: US 11,964,238 B2
(45) Date of Patent: Apr. 23, 2024

(54) METHOD AND APPARATUS FOR FORWARD AND REVERSE FLUSHABLE FILTER SYSTEM

(71) Applicant: Nephros Inc., South Orange, NJ (US)

(72) Inventor: Michael Milman, Brooklyn, NY (US)

(73) Assignee: Nephros Inc., South Orange, NJ (US)

( * ) Notice: Subject to any disclaimer, the term of this patent is extended or adjusted under 35 U.S.C. 154(b) by 347 days.

(21) Appl. No.: 17/097,167

(22) Filed: Nov. 13, 2020

(65) Prior Publication Data

US 2021/0138406 A1     May 13, 2021

Related U.S. Application Data

(60) Provisional application No. 62/934,784, filed on Nov. 13, 2019.

(51) Int. Cl.
*B01D 65/02* (2006.01)
*B01D 63/04* (2006.01)

(52) U.S. Cl.
CPC ........... *B01D 65/02* (2013.01); *B01D 63/046* (2013.01); *B01D 2313/18* (2013.01); *B01D 2321/02* (2013.01); *B01D 2321/04* (2013.01); *B01D 2321/12* (2013.01)

(58) Field of Classification Search
CPC ...... B01D 63/02; B01D 63/046; B01D 65/02; B01D 2313/083; B01D 2313/18; B01D 2313/48; B01D 2317/02; B01D 2317/025; B01D 2317/04; B01D 2321/02; B01D 2321/04; B01D 2321/12
See application file for complete search history.

(56) References Cited

U.S. PATENT DOCUMENTS

| | | |
|---|---|---|
| 6,171,481 B1 | 1/2001 | Walfridsson |
| 2002/0104800 A1 | 8/2002 | Collins |
| 2002/0144952 A1 | 10/2002 | Saxton |
| 2013/0319084 A1 | 12/2013 | Milman |
| 2018/0116255 A1* | 5/2018 | Demoulin .......... B01D 35/1573 |

* cited by examiner

*Primary Examiner* — Patrick Orme
(74) *Attorney, Agent, or Firm* — Leason Ellis LLP (57) ABSTRACT

A method for selectively cleaning a flushable filter system that includes a first filter unit and a second filter unit each of which is configured to purify unpurified liquid into purified liquid, the method comprises the steps of: operating the flushable filter system such that one of the first filter unit and the second filter unit is cleaned, while the other of the first filter unit and the second filter unit produced the purified liquid that is used to back flush the one of the first filter unit and the second filter unit that is being cleaned.

11 Claims, 7 Drawing Sheets

METHOD AND APPARATUS FOR FORWARD AND REVERSE FLUSHABLE FILTER SYSTEM

CROSS REFERENCE TO RELATED APPLICATION

The present application claims priority to and the benefit of U.S. patent application Ser. No. 62/934,784, filed Nov. 13, 2019, which is hereby expressly incorporated by reference in its entirety.

TECHNICAL FIELD

The present application is directed to a liquid purification filter system for use in a harsh environment that may include one or both of the following: (a) high levels of particulates that can plug the pores of the semi-permeable filter membrane used in the filter system that can result in a loss of filter performance over time; and (2) repetitive ON/OFF cycling of the filter system that creates pressure spikes (e.g., water hammer effects) that can result in a loss of filter integrity.

BACKGROUND

Many filter devices are available commercially and generally include a semi-permeable filter membrane which removes contaminates, such as particulates, macromolecules, or other organic materials, by a size exclusion method. Filter membranes can be made with many different materials and in different configurations, such as flat sheets or hollow fibers. One advantage of using hollow fiber membranes is that one can incorporate a larger membrane surface area in a given filter space or volume, and as such, can result in a more efficient filter system where size may be a constraining factor. With hollow fiber membranes, however, they can be more prone to rupture or collapse when the pressure differential across the membrane exceeds certain limits. As these membranes become fouled with particulates, etc. this places more stress on the membrane as a higher pressure differential is required to filter fluid at a given rate. In situations where the unfiltered fluid contains high levels of particulates, macromolecules, or other organic materials, the filter will become fouled more quickly and require more frequent replacement. Further, if the filter is used in an area where there is a cyclic demand of purified fluid, such as repetitive turning ON and OFF of the water flow at a faucet or valve, this can result in pressure spikes and pressure differentials that exceed those when flow is continuous through a phenomena known as the "water hammer" effect. The combination of these two factors can then lead to situation whereby the one or more of the hollow fiber filter membranes may rupture prematurely, which renders the filter unusable and inadequate if continuing to rely on it to produce a purified fluid.

There is therefore a need to provide a purification filter system that more effectively works in harsh conditions having high levels of substances that can plug the pores of these membranes or in areas that have repetitive ON/OFF cycling which results in a shock wave of pressure spikes that can damage the semi-permeable hollow fiber membrane making it unusable.

SUMMARY

A flushable filter system according to one embodiment includes a first filter unit having first filter media contained within a first filter housing. The first filter housing has a first inlet, a first outlet and a first flush port. The system includes a first inlet valve that is configured to control flow of unpurified liquid into the first inlet and a first flush port valve that is configured to control flow of at least one of unpurified liquid and purified liquid from the first filter housing. The system further includes a second filter unit having second filter media contained within a second filter housing. The second filter housing has a second inlet, a second outlet and a second flush port and a second inlet valve that is configured to control flow of unpurified liquid into the second inlet. The system includes a second flush port valve that is configured to control flow of at least one of unpurified liquid and purified liquid from the second filter housing. In accordance with present disclosure, the flushable filter system is configured such that one of the first filter unit and the second filter unit can be forward flushed, back flushed, or forward and back flushed at the same time.

A method for selectively cleaning a flushable filter system that includes a first filter unit and a second filter unit each of which is configured to purify unpurified liquid into purified liquid, the method comprises the steps of: operating the flushable filter system such that one of the first filter unit and the second filter unit is cleaned, while the other of the first filter unit and the second filter unit produced the purified liquid that is used to back flush the one of the first filter unit and the second filter unit that is being cleaned.

DETAILED DESCRIPTION OF PREFERRED EMBODIMENTS

The present disclosure is related to U.S. patent application Ser. No. 15/976,131, filed May 10, 2018, which is hereby incorporated by reference in its entirety.

Figure 1:
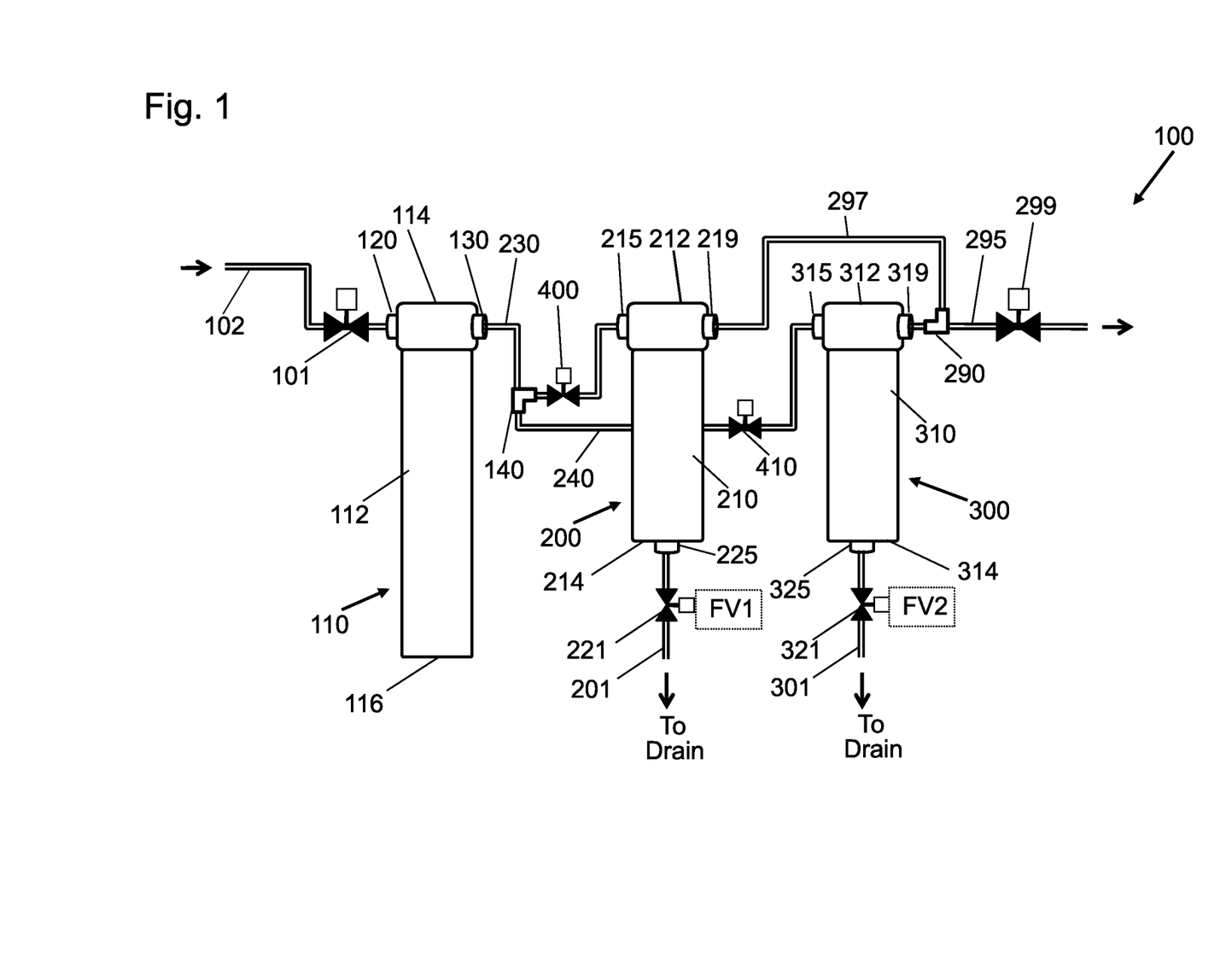
FIG. 1 is a schematic view of a purification system in accordance with one embodiment.
Figure 2:
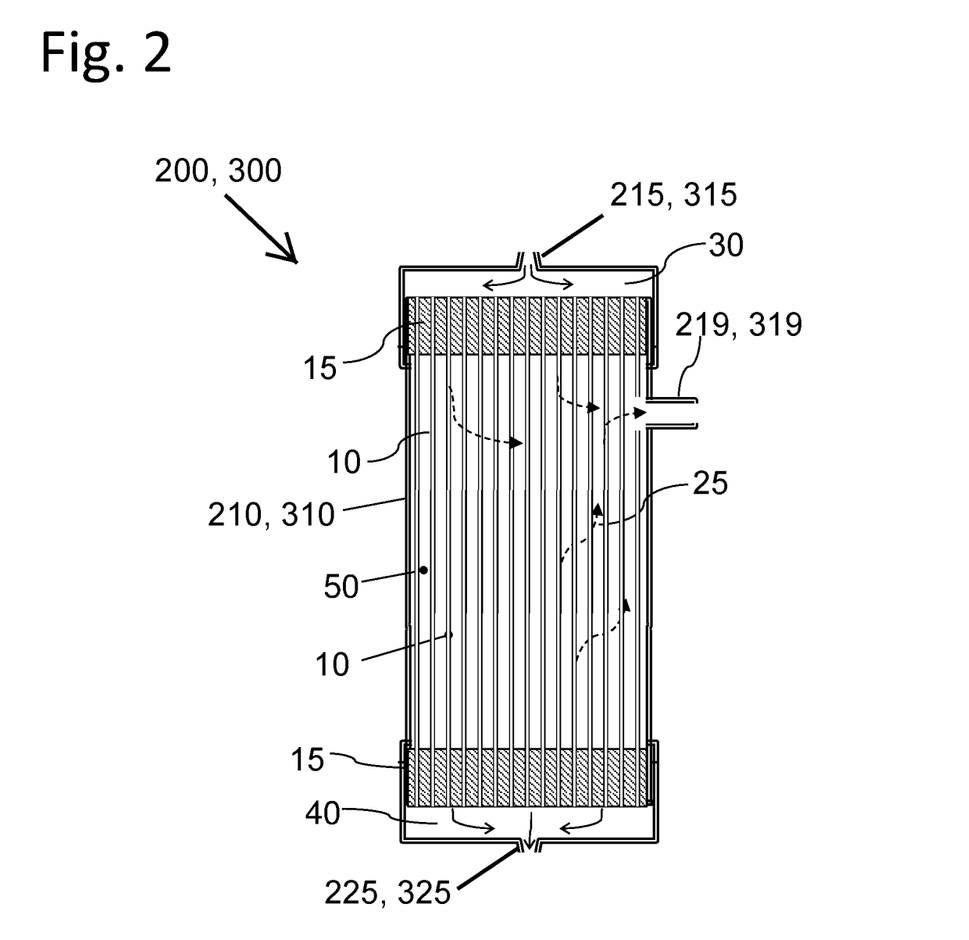
FIG. 2 is a cross-sectional view of a filter unit that is part of the purification system.

FIGS. 1 and 2 illustrate one flushable filter system, while FIGS. 3-7 illustrates another embodiment that is very similar but does not include a pre-filtering device/step.

In a first embodiment, a flushable filter system 100 is illustrated and is formed of two or more discrete filter units 200, 300 (assemblies) that are fluidly connected and the overall system is configured such that the flushable filter system 100 can be operated such that either of the filter units 200, 300 can be: (1) forward flushed; (2) back flushed or (3) forward and back flushed at the same time, thereby overcoming disadvantages of conventional systems. For ease of illustration, the filter unit 200 is described as being a first filter unit and the filter unit 300 is described as being a second filter unit. It will be appreciated that a third or more discrete filter unit can be added to the system 100.

The flushable filter system 100 includes a main inlet conduit 102 through which the liquid to be cleaned, such as unpurified water, travels into the flushable filter system 100 and in particular, as described herein, can travel to each of the first filter unit 200 and the second filter unit 300. A main inlet valve 101 can be provided to control flow through the main inlet conduit 102. In one embodiment, one end (distal end) of the main inlet conduit 102 can be connected to a splitter (e.g. tee-connector) (See, FIG. 3) that splits the liquid into a first flow path that is delivered to first filter unit 200 and a second flow path that is delivered to the second filter unit 300. Alternatively, as shown in FIG. 1, the distal end of the main inlet conduit 102 can be connected to a pre-filter 110. It will be appreciated that the unpurified liquid can be from a building water supply.

The pre-filter 110 is configured to provide an initial filtration of the unpurified liquid (unpurified water) prior to the liquid being delivered to each of the first filter unit 200 and the second filter unit 300. The pre-filter 110 comprises a vessel 112 (container or tank) that has a first end 114 and an opposite second end 116. The pre-filter 110 has an inlet port 120 coupled to the vessel 112 for delivering the unpurified liquid into the inside of the vessel 112 and an outlet port 130 for discharging the pre-filtered (once filtered) liquid from the vessel 112. The ports 120, 130 can be located at the same end (e.g., the first end 114 as shown) or can be located in other locations. However, the outlet port 130 must be provided at a location at which only once filtered liquid is received since the outlet port 130 discharges once filtered liquid.

The pre-filter 110 can include any number of types of conventional filter media, such as a polypropylene pre-filter media. For example, the unpurified liquid that enters the vessel 112 at a location to the exterior (outside) of the filter media and is then filtered across the filter media to the inside (other side) of the filter media and the outlet port 130 of the pre-filter 100 is in fluid communication with the inside of the filter media so that the once filtered (pre-filtered) liquid is discharged. As shown in the figures (FIGS. 3-7), the pre-filter 110 can be eliminated.

In the illustrated embodiment, a first connector 140 is fluidly connected to the outlet port 130 and in particular, for example, the first connector 140 can be directly connected to the outlet port 130 as shown or an outlet conduit (e.g., small length of tubing) can be connected between the outlet port 130 and the first connector 140. The first connector 140 is configured to split the once-filtered (when pre-filter 110 is present) or unfiltered, unpurified liquid (when the pre-filter 110 is not present) into a first stream that is delivered to the first filter unit 200 and a second stream that is delivered to the second filter unit 300.

In one embodiment, the first connector 140 can be in the form of an inlet tee-connector with a first leg being attached to the outlet portion 130; a second leg for delivering the first stream to the first filter unit 200; and a third leg for delivering the second stream to the second filter unit 300.

Each of the first filter unit 200 and the second filter unit 300 is now described and the fluid connections to the other components, including the first connector 140 are described.

The first filter unit 200 comprises a first filter vessel 210, such as a housing. container or tank, that has a first end 212 and an opposite second end 214. The first filter vessel 210 has an inlet port 215 into which once-filtered or unpurified (non-filtered) liquid is delivered and an outlet port 219 through which filtered, purified liquid is discharged. The outlet port 219 is thus positioned such that it only receives liquid that has been filtered within the first filter unit 200.

The first filter vessel 210 also includes a first flush port 225. In the illustrated embodiment, the inlet port 215 and outlet port 219 are located at the first end 212, while the first flush port 225 is located at the opposite second end 214 (which can be considered to be the flush port end). A first flush port valve 221 is provided and is connected to or in fluid communication with the flush port 225 of the first filter unit 200. The first flush port valve 221 is configured to open and close and can be formed of any number of different types of valves that are suitable for the intended application. As with the other valves discloses herein, the first flush port valve 221 can be connected to a main control unit (controller) 90 that can control operation over the operating states of the first flush port valve 221. For example, the first flush port valve 221 can be run on a schedule and be a timer-activated valve. Alternatively, the first flush port valve 221 can be operated manually.

The second filter unit 300 comprises a second filter vessel 310, such as a housing. container or tank, that has a first end 312 and an opposite second end 314. The second filter vessel 310 has an inlet port 315 into which once-filtered or unpurified (non-filtered) liquid is delivered and an outlet port 319 through which filtered, purified liquid is discharged. The outlet port 319 is thus positioned such that it only received liquid that has been filtered within the second filter unit 300.

The second filter vessel 310 also includes a second flush port 325. In the illustrated embodiment, the inlet port 315 and outlet port 319 are located at the first end 312, while the second flush port 325 is located at the opposite second end 314 (which can be considered to be the flush port end). A second flush port valve 321 is provided and is connected to or in fluid communication with the flush port 325 of the second filter unit 300. The second flush port valve 321 is configured to open and close and can be formed of any number of different types of valves that are suitable for the intended application. As with the other valves discloses herein, the second flush port valve 321 can be connected to a main control unit (controller) 90 that can control operation over the operating states of the second flush port valve 321. For example, the second flush port valve 321 can be run on a schedule and be a timer-activated valve. Alternatively, the second flush port valve 321 can be operated manually.

The inside of each of the first filter unit 200 and the second filter unit 300 can be the same or similar to the filter units described and illustrated in the '131 application which is expressly incorporated herein. FIG. 2 generally shows the inside of one exemplary filter unit 200, 300. For example, each of the first filter unit 200 and the second filter unit 300 can contain a filter element 10 which can include a bundle of semi-permeable hollow fiber membranes (i.e., a plurality of hollow fibers) that are potted (with potting compound 15) at each end of the hollow fibers inside the filter housing and thus forms a first header space 30 at the inlet port end of the filter device and a second header space 40 at the flush port end of the respective filter device 200, 300.

In the illustrated embodiment, a first inlet conduit 230 fluidly connects the first leg of the first connector 140 to the inlet port 215 of the first filter vessel 210 and a second inlet conduit 240 fluid connects the second leg of the first connector 140 to the inlet port 315 of the second filter vessel 310. In this way, liquid that is to be filtered is delivered to both the first filter unit 200 and the second filter unit 300 through the first connector 140. The first inlet conduit 230 and the second inlet conduit 240 can be in the form of hoses (e.g., braided hoses) or tubing.

A first inlet valve 400 is provided prior to the inlet port 215 and can be formed along the first inlet conduit 230 and is configured to control the flow of the unpurified liquid into the first filter unit 200 and more specifically, the first inlet valve 400 can have an open (on) state in which fluid can freely flow through the first inlet valve 400 into the first vessel 210 and a closed (off) state in which fluid is prevented from flowing into the first vessel 210.

A second inlet valve 410 is provided prior to the inlet port 315 and can be formed along the second inlet conduit 240 and is configured to control the flow of the unpurified liquid into the second filter unit 300 and more specifically, the second inlet valve 410 can have an open (on) state in which fluid can freely flow through the second inlet valve 410 into the second vessel 310 and a closed (off) state in which fluid is prevented from flowing into the second vessel 310.

Any number of different types of suitable valves can be used so long as they are suitable for the present application. In addition, the valves 400, 410 can be connected to a controller, such as controller 90 (FIG. 3) that permits control over the valves 400, 410 and in particular, the states of the valves 400, 410 can be controlled electronically using the controller. The controller 90 can be part of or connected to a computing device having a processor that executes software and memory in which a schedule, for example, can be stored.

Alternatively, the valves 400, 410 can be manually operated.

The outlet ports 219, 319 are also fluid coupled to one another in that a second connector 290 can be provided and can be in the form of a tee-connector in which a first leg of the second connector 290 is fluidly connected to the outlet port 219 of the first filter unit 200 and the second leg of the second connector 290 is fluidly connected to the outlet portion 319 of the second filter unit 300, while a third leg of the second connector 290 is fluidly connected to a main outlet conduit 295 which carries purified liquid from both the first filter unit 200 and the second filter unit 300. As shown, another outlet conduit 297 can be connected between the outlet portion 219 of the first filter unit 200 and the first leg of the second connector 290. The second leg of the second connector 290 can be directly attached to the second leg of the second connector 290 or another outlet conduit (not shown) can fluidly connect the two. The main outlet conduit 295 and the other outlet conduits can be in the form of hoses (e.g., braided hoses) or tubes or the like.

Filter Units 200, 300

The filter units 200, 300 are configured to remove unwanted particulates, macromolecules, and/or other organic materials by size exclusion based on the pore size of the filter membrane.

As mentioned, each filter unit 200, 300 is generally composed of the filter housing (vessel) 210, 310 and contains the inlet port 215, 315 for receiving an unpurified liquid such as water and the outlet port 219, 319 for delivering the purified liquid after passing through the filter unit 200, 300. The filter unit 200, 300 also includes a flush port 225, 325 which is used to periodically purge the upstream compartment of the filter unit 200, 300 to remove accumulated materials which builds up during operation of the filter unit. The filter unit 200 is operated such that unpurified liquid flows through the first inlet conduit 230 which leads to the inlet port 215. The first inlet valve 400 may be used to control the flow of unpurified liquid into the first filter unit 200 which may be based upon its availability or the demand of purified fluid. Unpurified liquid then enters the inlet header space 30 and flows into the upstream side of the semi-permeable hollow fiber membranes 10. An "upstream compartment" or "upstream space" is one which is upstream of the filter membrane and thus includes first header space 30, the second header space 40, and inside of the hollow fibers 10 (their lumens), as well as along the first inlet conduit 230 (and the second inlet conduit 240).

The first flush port valve 221 is positioned at the flush port end to prevent fluid from exiting through a conduit 201 connected to the first flush port valve 221. It will be appreciated that the conduit 201 is in fluid communication with the upstream side of the hollow fibers (and spaces 30 and 40) and thus, fluid pressure within the conduit 201 is representative of the upstream fluid pressure (conduit 301 is connected to the second flush port valve 321). With the first flush port valve 221 closed, the unpurified liquid is filtered across the semi-permeable hollow fiber membrane 10 (see arrow 25) and flows into a downstream compartment 50 of the filter unit (located outside of the hollow fibers). The filtered liquid then flows out through the outlet port 219 which is in fluid communication with outlet conduit 297. An outlet valve (not shown) may also be used to control the flow purified liquid out of the filter unit which may be based on the required downstream demand of the purified liquid. It is recognized that flow through the filter is driven by a pressure differential across the filter membrane and that as the membrane becomes fouled with materials that are being removed by the filter membrane, the mechanical stresses experienced by the membrane are generally increased. The result of these increased mechanical stresses is that there can be a premature failure of the filter membrane, such as a rupture of one or more of the hollow fiber membranes. Because the filter is based on a size exclusion principle, any loss of filter integrity results in a loss of effectiveness. For example, if the filter is being used to remove bacteria, a loss of filter integrity would result in bacteria being present downstream which could cause an adverse and/or unexpected condition if it were to go unnoticed. To avoid and/or minimize the stress conditions that may negatively impact the filter membrane integrity, a control unit can be used to control the opening and closing of the first flush port valve 221. Frequency and timing for how long the flush valve remains opened can be set by the control unit and may be adjustable based on the contaminate levels of the fluid being filtered. Upon opening the first flush port valve 221, flow of the liquid from the upstream compartment of the first filter unit 200 flows into the second header compartment 40 and through the conduit 201 which is connected to the flush port of the first filter unit 200. Upon passing through the first flush port valve 221, the flushed liquid can be directed to a suitable drain fixture. It will be appreciated that the liquid that is used to flush the system by passing through hollow fibers is not purified water but instead is unpurified water which is in contrast to typical reverse type flushes.

It is also recognized that cyclic use of the filter unit causes additional mechanical stresses on the filter membrane. For example, upon closing the outlet valve (not shown) in a pressure driven system will result in a transient pressure spike due to conservation of momentum of the flowing stream. The pressure spike sets up a shock wave which travels back to the filter membrane and further contributes additional mechanical stresses not normally observed. In combination with the membrane becoming fouled by accumulation of contaminating substances, the stresses at the membrane level are further increased and thus more prone to early failure. It should then be understood by those skilled in the art, that periodic flushing of these contaminates thus serves to extend the life of the filter, in particular in harsh conditions with high levels of contaminate and cyclic operation of the filter.

Thus, a pressure spike can occur when the outlet valve closes quickly and there is insufficient time for the feed water device (e.g., a pump, regulator, or combination) to self-adjust to the preset inlet pressure; or, alternatively, a pressure spike can result when the feed water device (e.g., a pump) ramps up too quickly due to inefficiency in control/adjustment as a result of water pressure changing quickly when other outlets in the main system are opened or closed.

The present system 100 addresses and overcomes these issues and concerns.

Figure 3:
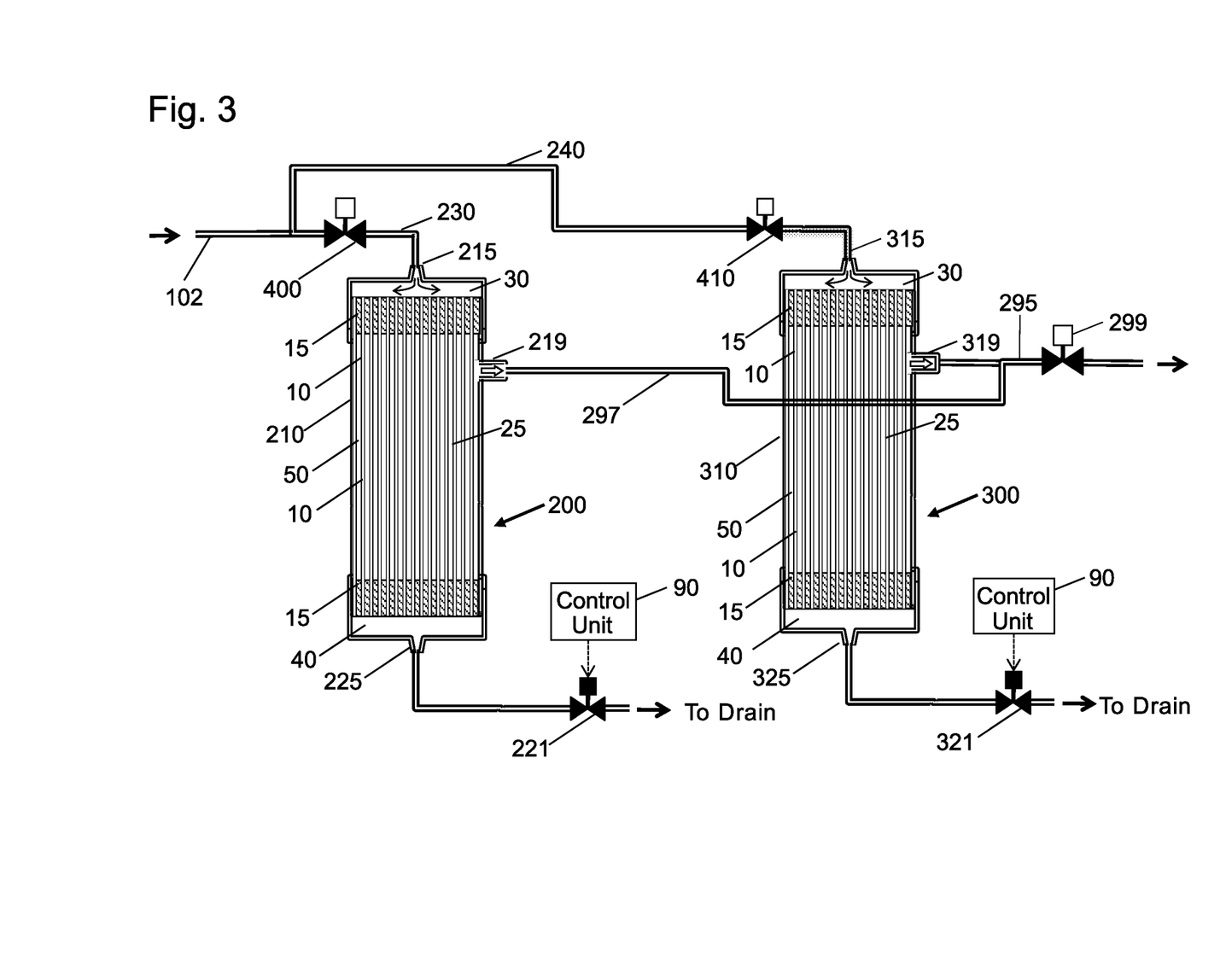
FIG. 3 is a schematic view of a purification system in accordance with another embodiment.
Figure 7:
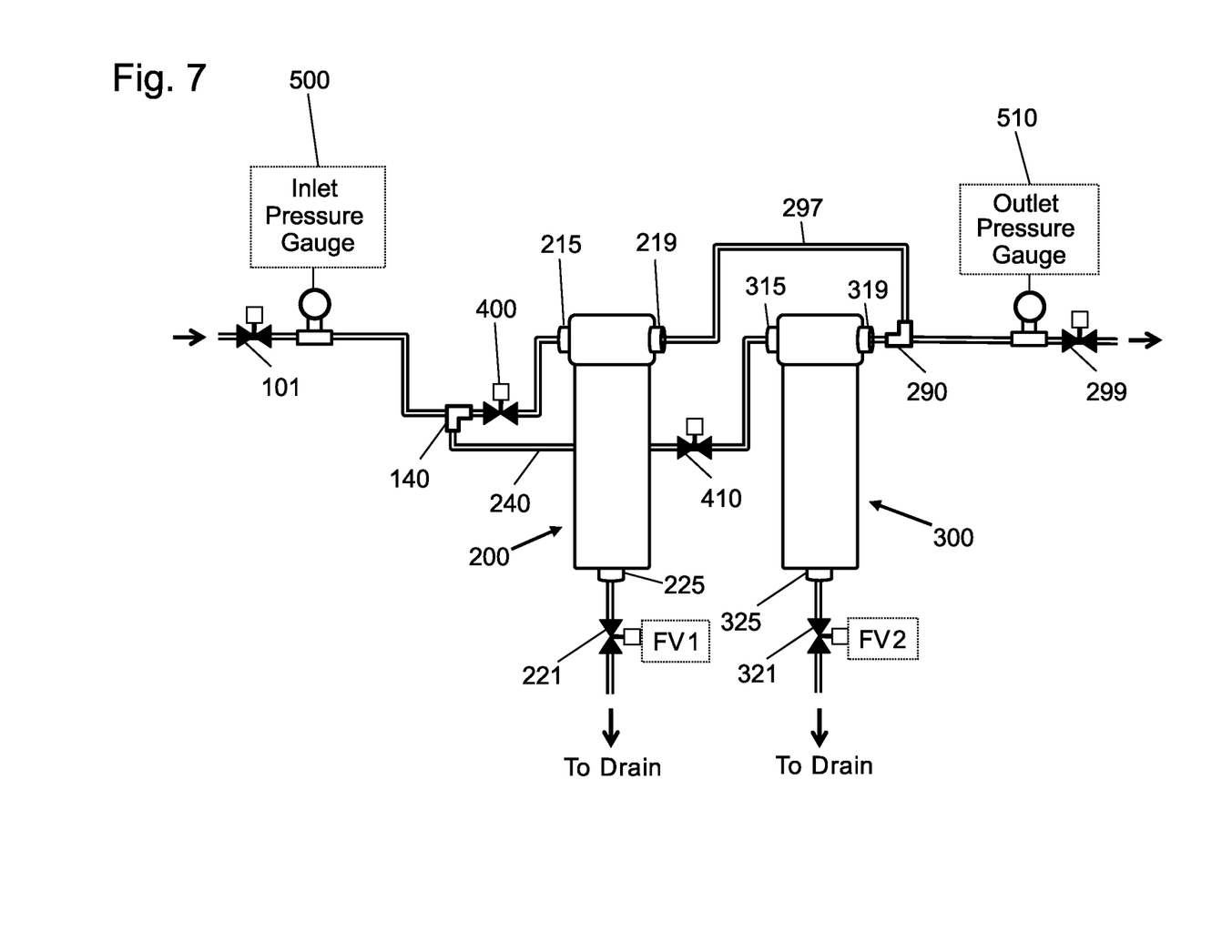
FIG. 7 is a schematic of one exemplary purification system.

FIG. 7 illustrates one exemplary system which is similar to the system of FIG. 3 and like elements are thus numbered alike.

Various Operating Modes

As mentioned, filter clogging due to vast types and amounts of particulates in the liquid (water) directly impacts the filter life in terms of resistance to stress (induced via on/off cycles) and overall filer flow rate (more clogging cause large reduction in flow rate.

Forward Flushing

The related '131 application mentioned herein addresses the fouling and stress by flushing achieved via a "forward flushing" mechanism. Forward flushing is achieved due to cylindrical nature of the hollow fiber with filtration through the wall of the cylinder. With designed access to cylinder inlet (unpurified water) and outlet (flush port), the collected particulates are released every so often via opening of the flush-port. This extends the life of the filter by reducing the clogging of the suspended particulates (those free floating or perhaps loosely connected to the membrane wall). The advantage of this application is the ability to use the system water pressure to clean the filter.

Back Washing

Another means of cleaning the filter membrane (e.g., filter membrane 10) is to perform back washing. Back washing involves pushing the water in reverse (outlet to inlet) through the membrane which not only clears the accumulated suspended particulates, but also those more firmly attached the wall of the membrane. The disadvantages of performing a back washing are mostly in the complexity and difficulty of such operation for a large plumbed in system and namely, the disadvantages can be listed as the following:
1. Only purified water can be used and thus a collection tank with purified water at the outlet is needed;
2. Inlet system pressure can't be used to perform this operation so an external energy source (pump or pressurized air system) is needed to push the water through the system;
3. Since additional purified water tank is needed, additional on/off valves and systems to control those valves are needed;
4. Additional dual on/off valve or diverter valve would be needed to close of the inlet water and open the filter system inlet to release the dirty water; and
5. Water coming out is highly concentrated dirty water and a catch mechanism is needed to maintain cleanliness and safety.

Operating Modes of the Present System

As described herein, the present system 100 allows a user to perform both a forward flush and a back wash in a new and much more effective way and more specifically, instead of a back-wash, as described above, a back-flush is performed. It operates just as a back-wash but water is pushed out through the flush-port mechanism which solves items 4 & 5 listed above.

The design of the system 100 allows for either of the filers 10 in the first filter unit 200 or the second filter unit 300 to be forward flushed, back-flushed, or forward and back flushed at the same time without any additional mechanisms or problems identified in items 1, 2, and 3 listed above.

Figure 4:
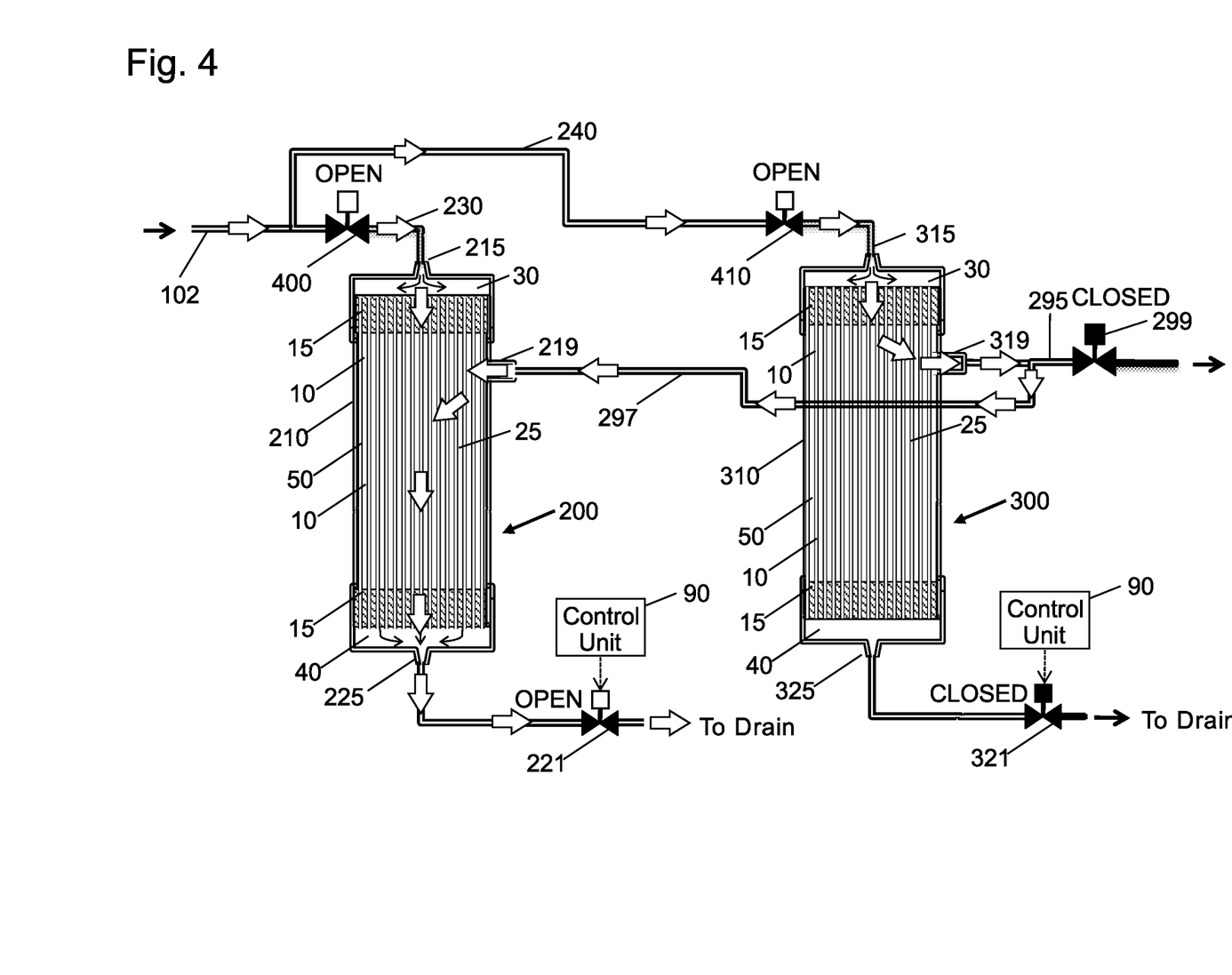
FIG. 4 is a schematic of the purification system of FIG. 3 showing a forward and back flush mode of operation in which a first filter unit is both forward and back flushed at the same time.

Back Flush with Forward Flush (FIG. 4)

In this first mode of operation shown in FIG. 4, a downstream device (not shown) that is connected to the main outlet conduit 295 is not pulling (demanding) purified liquid (water) generated by the system 100. This can occur by closing a valve 299 that is associated with the downstream device itself (the device that is demanding purified liquid) and/or is located along the main outlet conduit 295 upstream of the downstream device. Both the first and second inlet valves 400, 410 are open and the first flush port valve 221 is open, while the second flush port valve 321 is closed. The valve 101 is open to allow unpurified liquid (or pre-filtered) liquid to flow to the first and second filter units 200, 300.

In this first mode of operation, both a forward flush and a back flush occur in one of the two filter units 200 and 300 at a time intermittently (or as desired). For example, and as shown in FIG. 4, the first filter unit 200 can be forward flushed and back flushed and then the operating states can be changed and the second filter unit 300 can be forward flushed and back flushed. Since the first inlet 215 is open and the first flush port valve 221 is open, the liquid introduced through the first inlet 215 travels into first header space 30 into the lumens of membranes 10 and then flows into the second header space 40 and out the first flush port 225. This is forward flushing of the filter media (membranes 10) of the first filter unit 200. At the same time, the same filter unit 200 is also back flushed. Since the second flush port valve 321 is closed, forward flushing in the second filter unit 300 does not occur. Unpurified liquid still enters the second filter unit 300 through the inlet port 315 and the outlet port 319 is open and this causes the unpurified liquid within the lumens of the membranes 10 in the second filter unit 300 to travel across the membranes into the downstream compartment 50 of the second filter unit 300 which is in fluid communication with the outlet port 319. The liquid is now purified and flows through the outlet port 319 and in reverse manner through the conduit 297 (since device or outlet valve 299 is closed) and into the outlet port 219 of the first filter unit 200 where it enters the downstream compartment 50 of the first filter unit 200. Since the first flush port valve 221 is open, this liquid in the downstream compartment 50 of the first filter unit 200 is then conducted across (in reverse) the membranes 10 of the first filter unit 200 into the lumens thereof and flows to the second header space 40 and through the first flush port 225.

Thus, the above description covers the forward flushing and the back flushing of the first filter unit 200. In a scheduled manner, this process is reversed so that the second filter unit 300 is forward flushed and back flushed. In this operating state, the second flush port valve 321 is open, while the first flush port valve 221 is closed. The process that was described above is simply switched in that purified liquid from the first filter unit 200 is then drawn into the first outlet port 219 and travels through conduit 297 to the second conduit port 319 and enters the downstream compartment 50 of the second filter unit 300. This liquid is then conducted across the membrane 10 in the second filter unit 300 into the lumens thereof and flows into the second header space 40 and through the second flush port 325.

FIG. 4 has been annotated to show the states of the valves and to show the direction of flow during this mode of operation (i.e., forward and back flush of unit 200).

Figure 5:
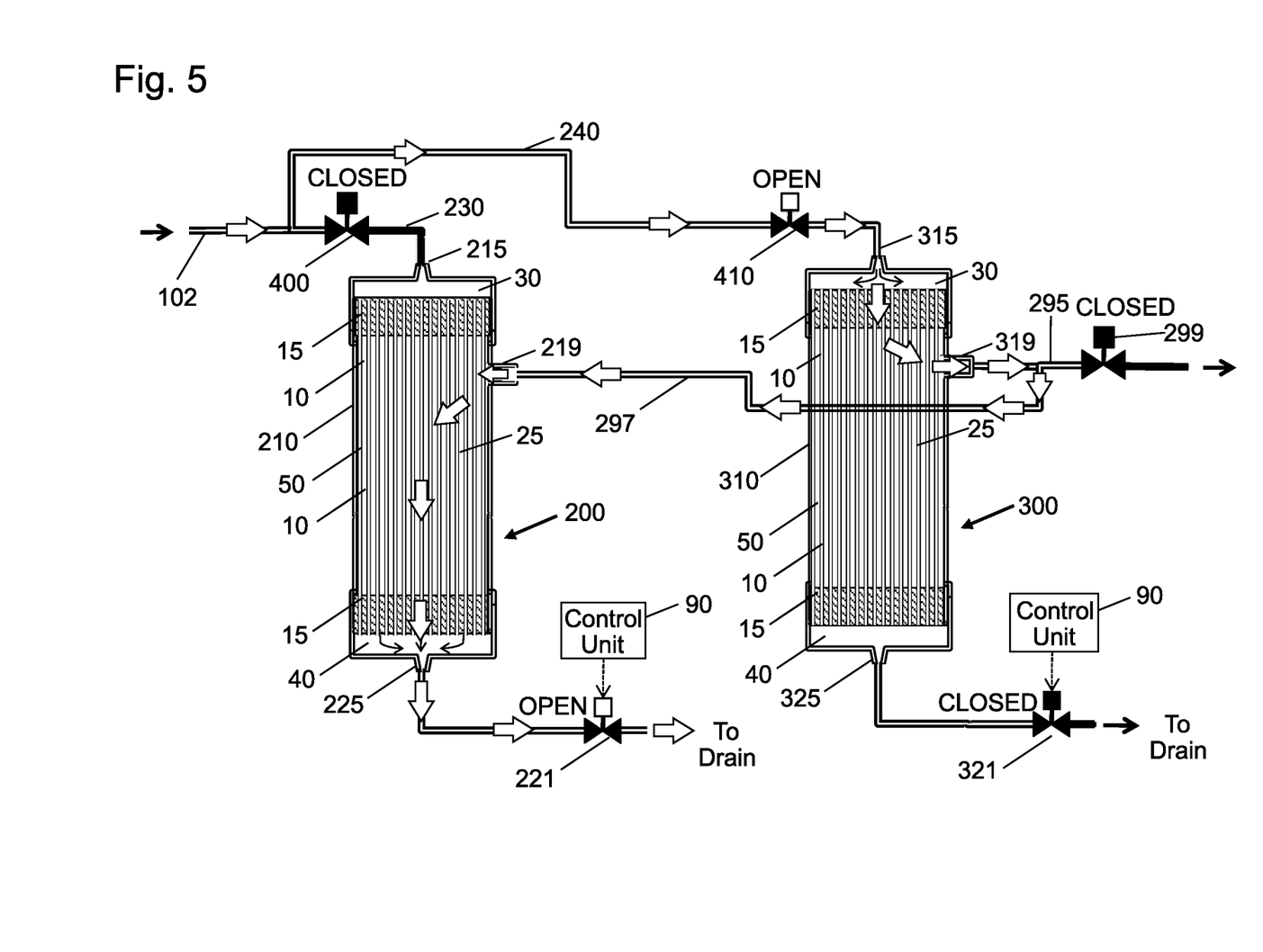
FIG. 5 is a schematic of the purification system of FIG. 3 showing a back flush mode of operation in which a first filter unit is back flushed.

Back Flush (FIG. 5)

In another operating mode, a back flush is performed in a selected one of the first filter unit 200 and the second filter unit 300. As in the above mode, the back flush operation uses purified liquid (water) that is generated in one filter unit to back flush the other filter unit. To perform a back flush of the first filter unit 200 as shown in FIG. 5, the first inlet valve 400 is closed, while the second inlet valve 410 is open. The first flush port valve 221 is open, while the second flush port valve 321 is closed. This arrangement causes unpurified liquid to only enter the second filter unit 300 and since the second flush port valve 321 is closed, the liquid is conducted across the membrane 10 into the downstream compartment 50 and flows out the second outlet port 319 through the conduit 297 into the first outlet port 219 and into the downstream compartment 50 of the first filter unit 200 and then across the membrane 10 into the lumens thereof and flows to the second header space 40 and then exits through the first flush port 225 (since first flush port valve 221 is open).

To back flush the second filter unit 300, the process is reversed. The second inlet valve 410 is closed, while the first inlet valve 400 is open. The second flush port valve 321 is open, while the first flush port valve 221 is closed. This arrangement causes unpurified liquid to only enter the first filter unit 200 and since the first flush port valve 221 is closed, the liquid is conducted across the membrane 10 into the downstream compartment 50 and flows out the first outlet port 219 through the conduit 297 into the second outlet port 319 and into the downstream compartment 50 of the second filter unit 300 and then across the membrane 10 into the lumens thereof and flows to the second header space 40 and then exits through the second flush port 325 (since second flush port valve 321 is open).

FIG. 5 has been annotated to show the states of the valves and to show the direction of flow during this mode of operation (i.e., back flush of unit 200).

Figure 6:
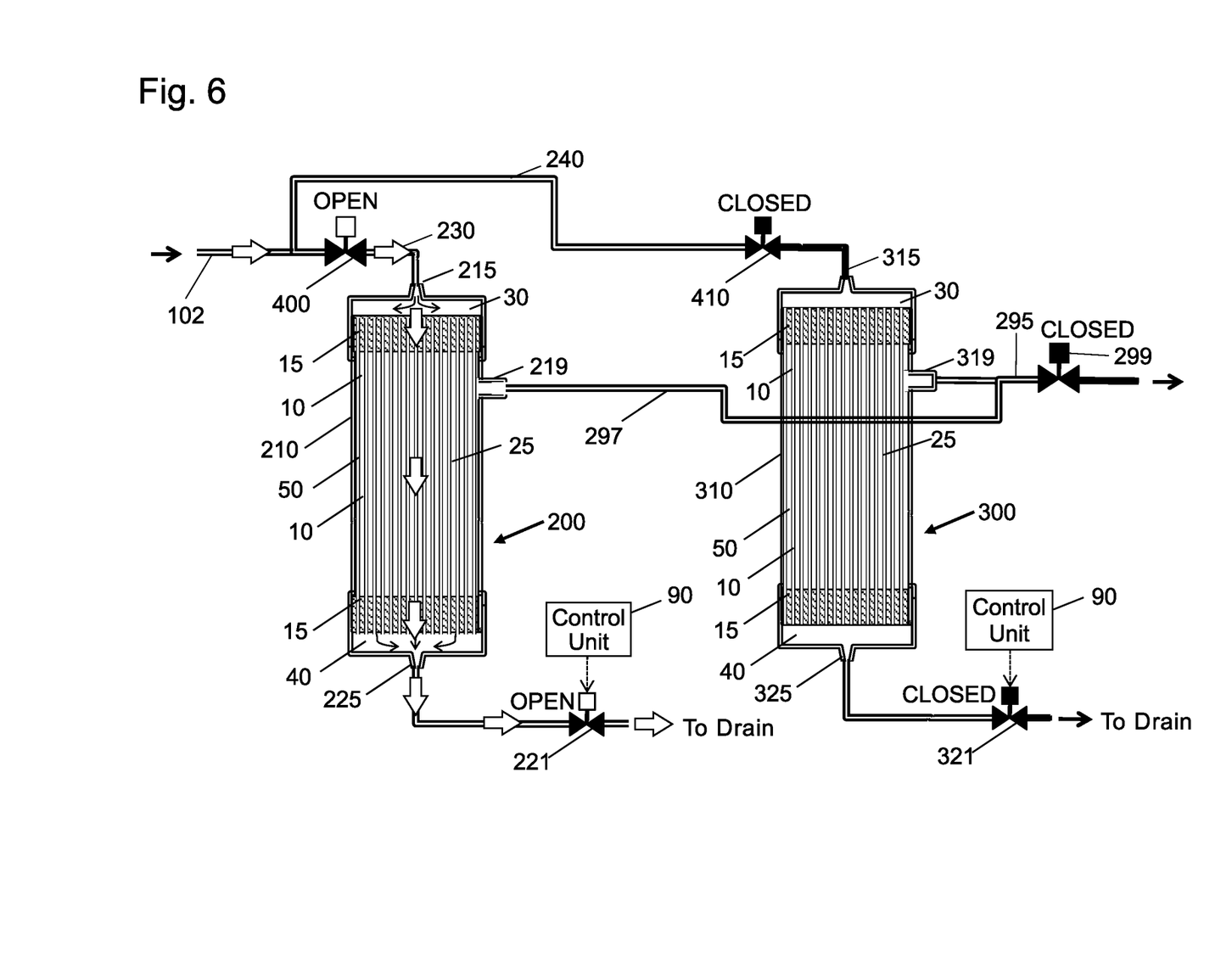
FIG. 6 is a schematic of the purification system of FIG. 3 showing a forward flush mode of operation in which a first filter unit is forward flushed.

Forward Flush (FIG. 6)

To perform a forward flush, only one of the filter units 200, 300 receives liquid. To forward flush the first filter unit 200, the second inlet valve 410 is closed and the first inlet valve 400 is open. The first flush port valve 221 is open, while the second flush port valve 321 is closed. Liquid enters the first filter unit 200, flows into the first header space 30 into the lumens of membranes 10 into the second header space 40 and then out the first flush port 225. No liquid flows into the second filter unit 300.

To forward flush the second filter unit 300 as shown in FIG. 6, the first inlet valve 400 is closed and the second inlet valve 410 is open. The second flush port valve 321 is open, while the first flush port valve 221 is closed. Liquid enters the second filter unit 300, flows into the first header space 30 into the lumens of membranes 10 into the second header space 40 and then out the second flush port 325. No liquid flows into the first filter unit 200.

FIG. 6 has been annotated to show the states of the valves and to show the direction of flow during this mode of operation (i.e., forward flush of unit 200).

FIG. 7

FIG. 7 shows an embodiment in which an inlet pressure gauge 500 is located along the inlet conduit downstream of the main inlet valve 101 and an outlet pressure gauge 510 is located along the outlet conduit upstream of the outlet valve 299. These pressure gauges 500, 510 are configured to detect pressure within the respective lines (conduits). By knowing the pressure at the inlet side and the pressure at the outlet side, a user can understand the pressure differential across the filter units 200, 300. For example, if clogging exists in the filter unit 200, a pressure buildup at the inlet pressure gauge 500 will be observed and similarly, a reduction in pressure can be observed at the outlet pressure gauge 510. These gauges 500, 510 can communicate with the control unit 90.

Modular Aspect

It will be appreciated that more than two filter units can be connected in the manner described and illustrated herein.

In addition, the system 100 allows the user to offset the automatic valve flush times to not reduce flow rate to the downstream device during the operation of a flush cycle.

In very sediment heavy applications, the combination of forward and back (reverse) flush, could be even more effective than back flush alone, since water is moving from both sides of the membrane promoting additional dislodging of possibly lodged/attached particulates.

Since there are multiple independent filter units in the system 100, it is possible to operate the external downstream device at the same time as one of the above-described operating modes are being performed. The downstream device has a draw of purified liquid from the plurality of filter units and this can occur since one of the filter units can be isolated and only one of the flush port valves can be opened.

Advantages of the Present System

The present system 100 is designed so that a single liquid source can be used with the two unit filtration system 200, 300 to perform a cleaning operation in one of the filtration units and at the same time perform a liquid purification operation in the other of the filtration units.

Thus, the same pressurized liquid is delivered to both filtration units 200, 300 using the same source of fluid and using the same equipment, such as a pump, for delivering the pressurized liquid to the system 100. As mentioned, a building water supply can be used to provide the pressurized liquid to the system 100. The present system thus broadly is one in which one filtration unit 200, 300 is taken offline from performing purification and instead is cleaned, while the other filtration unit 200, 300 does purifying fluid that is then used to back flush the one filtration unit 200, 300. Since common fluid source and common equipment is used, the system provides an efficient, economic way of cleaning filtration units 200, 300 that are fluidly connected.

In another aspect, the present system 100 provides a dual filter system that allows the equipment that needs the purified water to continue to operate while one of the filters is being cleaned. Thus, the system allows cleaning of one of the other of the filters during equipment operation.

It will be appreciated that the forward flush is designed to clean the inner lumens of the filter membranes (e.g., fibers) by passing the pressurized fluid through the inner lumens. The back flush is designed to clean the walls of the filter membranes (e.g., fibers) since the pressurized fluid is conducted across the walls of the filter membranes and cleans any debris in the pores of the walls of the filter membranes or other debris along these walls. Since the pressurized fluid is conducted across the walls of the filter membranes from the exterior to the inside (inner lumen) of the filter membranes, the filter membranes are cleaned by this back flush operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A flushable filter system comprising:
a first filter unit having first filter media contained within a first filter housing, the first filter housing having a first inlet, a first outlet and a first flush port;
a first inlet valve that is configured to control flow of unpurified liquid into the first inlet;
a first flush port valve that is configured to control flow of at least one of unpurified liquid and purified liquid from the first filter housing;
a second filter unit having second filter media contained within a second filter housing, the second filter housing having a second inlet, a second outlet and a second flush port;
a second inlet valve that is configured to control flow of unpurified liquid into the second inlet; and
a second flush port valve that is configured to control flow of at least one of unpurified liquid and purified liquid from the second filter housing;
wherein the flushable filter system is configured such that one of the first filter unit and the second filter unit has the following cleaning states: (1) forward flush, (2) back flush, and (3) simultaneous forward and back flush;
wherein when the first filter unit is forward-flushed, unpurified liquid flows from the first inlet through the first filter media to the first flush port while the second filter does not receive unpurified liquid, and conversely, when the second filter unit is forward flushed, unpurified liquid flows from the second the second filter media to the second flush port while the first filter does not receive unpurified liquid.

2. The system of claim 1, further including:
a first connector that is in fluid communication with the first inlet and the second inlet for delivering unpurified liquid to the first inlet via a first inlet conduit and the second inlet via a second inlet conduit;
a main outlet conduit that is attached to the second outlet; and
a secondary outlet conduit that has a first end that is in fluid communication with the main outlet conduit and a second end that is in fluid communication with the first outlet.

3. The system of claim 2, wherein when the first filter unit is back-flushed, purified liquid flows from the second filter unit through the secondary outlet conduit to the first outlet and conversely, when the second filter unit is back flushed, purified liquid flows from the first filter unit through the secondary outlet conduit to the second outlet.

4. The system of claim 2, further including a main outlet valve located along the main outlet conduit downstream of the second outlet conduit; and
wherein the flushable filter system has a plurality of operating modes including:
a first operating mode in which the first filter unit is forward flushed and the second filter unit is offline;
a second operating mode in which the second filter unit is forward flushed and the first filter unit is offline;
a third operating mode in which the first filter unit is both forward and back flushed at the same time using purified liquid generated in the second filter unit;
a fourth operating mode in which the second filter unit is both forward and back flushed at the same time using purified liquid generated in the first filter unit;
a fifth operating mode in which the first filter unit is back flushed using purified liquid generated in the second filter unit; and
a sixth operating mode in which the second filter unit is back flushed using purified liquid generated in the first filter unit.

5. The system of claim 4, wherein:
in the first operating mode, the first inlet valve is open, the second inlet valve is closed, the first flush port valve is open, the second flush port valve is closed and the main outlet valve is closed;
in the second operating mode, the first inlet valve is closed, the second inlet valve is open, the first flush port valve is closed, the second flush port valve is open and the main outlet valve is closed;
in the third operating mode, the first inlet valve is open, the second inlet valve is open, the first flush port valve is open, the second flush port valve is closed and the main outlet valve is closed;
in the fourth operating mode, the first inlet valve is open, the second inlet valve is open, the first flush port valve is closed, the second flush port valve is open and the main outlet valve is closed;
in the fifth operating mode, the first inlet valve is closed, the second inlet valve is open, the first flush port valve is open, the second flush port valve is closed and the main outlet valve is closed; and
in the sixth operating mode, the first inlet valve is open, the second inlet valve is closed, the first flush port valve is closed, the second flush port valve is open and the main outlet valve is closed.

6. The system of claim 2, wherein when the system is configured to back flush the first filter unit, purified fluid flows through the secondary outlet conduit in a first direction from the second filter unit to the first filter unit and when the system is configured to back flush the second filter unit, purified fluid flows through the secondary outlet conduit in a second direction from the first filter unit to the second filter unit.

7. The system of claim 1, wherein each of the first filter media and the second filter media comprises a bundle of fibers having inner lumens.

8. The system of claim 1, wherein the system includes a single source of unpurified liquid that flows through a main inlet conduit that branches into a first inlet conduit and a second inlet conduit, the first inlet conduit being connected to the first inlet for delivering the unpurified liquid to the first inlet and the second inlet conduit being connected to the second inlet for delivering the unpurified liquid to the second inlet.

9. A flushable filter system comprising:
a main inlet conduit that branches into a first inlet conduit and a second inlet conduit;
a main outlet conduit;
a first filter unit having first filter media contained within a first filter housing, the first filter housing having a first inlet that is fluidly connected to the first inlet conduit, a first outlet and a first flush port;
a first inlet valve that is configured to control flow of unpurified liquid into the first inlet;
a first flush port valve that is configured to control flow of at least one of unpurified liquid and purified liquid from the first filter housing;
a second filter unit having second filter media contained within a second filter housing, the second filter housing having a second inlet that is fluidly connected to the second inlet conduit, a second outlet that is connected to the main outlet conduit and a second flush port;
a second inlet valve that is configured to control flow of unpurified liquid into the second inlet;
a second flush port valve that is configured to control flow of at least one of unpurified liquid and purified liquid from the second filter housing; and
a secondary outlet conduit that branches off of the main outlet conduit and is fluidly connected to the first outlet;
wherein the flushable filter system is configured such that one of the first filter unit and the second filter unit can undergo a cleaning operation, while the other of the first filter unit and the second filter unit produces purified liquid that is delivered to the first filter unit for back flushing thereof.

10. The system of claim 9, wherein the secondary outlet conduit branches off of the main outlet conduit at a location upstream of an outlet valve that is configured to control flow of the purified liquid from the second filter unit.

11. A flushable filter system comprising:
a main inlet conduit that branches into a first inlet conduit and a second inlet conduit at a first connector;
a main outlet conduit that includes a main outlet valve;
a first filter unit having first filter media contained within a first filter housing, the first filter housing having a first inlet that is fluidly connected to the first inlet conduit, a first outlet and a first flush port;
a first flush port conduit connected to the first flush port for delivering unpurified liquid to a drain;
a first inlet valve that is configured to control flow of unpurified liquid into the first inlet;
a first flush port valve that is disposed within the first flush port conduit and is configured to control flow of at least one of unpurified liquid and purified liquid from the first filter housing;
a second filter unit having second filter media contained within a second filter housing, the second filter housing having a second inlet that is fluidly connected to the second inlet conduit, a second outlet that is connected to the main outlet conduit and a second flush port;
a second inlet valve that is located along the second inlet conduit and is configured to control flow of unpurified liquid into the second inlet;
a second flush port conduit connected to the second flush port for delivering unpurified liquid to the drain;
a second flush port valve that is disposed within the second flush port conduit and is configured to control flow of at least one of unpurified liquid and purified liquid from the second filter housing; and
a secondary outlet conduit that branches off of the main outlet conduit at a second connector and is fluidly connected to the first outlet of the first filter unit at one end and to the second connector at the opposite end, wherein the main outlet valve is downstream of the second connector;
wherein the flushable filter system is configured such that one of the first filter unit and the second filter unit can undergo a cleaning operation, while the other of the first filter unit and the second filter unit produces purified liquid that is delivered to the first filter unit for back flushing thereof.

* * * * *